US012686525B2

(12) United States Patent
Bonardi

(10) Patent No.: US 12,686,525 B2
(45) Date of Patent: Jul. 21, 2026

(54) MACHINE FOR APPLYING SAFETY STRIPS TO THE UPPER PART OF CONTAINERS

(71) Applicant: P.E. LABELLERS S.P.A., Porto Mantovano (IT)

(72) Inventor: Luca Bonardi, San Giorgio Bigarello (IT)

(73) Assignee: P.E. LABELLERS S.P.A., Porto Mantovano (IT)

( * ) Notice: Subject to any disclaimer, the term of this patent is extended or adjusted under 35 U.S.C. 154(b) by 0 days.

(21) Appl. No.: 18/832,244

(22) PCT Filed: Sep. 9, 2022

(86) PCT No.: PCT/EP2022/075164
§ 371 (c)(1),
(2) Date: Jul. 23, 2024

(87) PCT Pub. No.: WO2023/147896
PCT Pub. Date: Aug. 10, 2023

(65) Prior Publication Data

US 2025/0100737 A1 Mar. 27, 2025

(30) Foreign Application Priority Data

Feb. 1, 2022 (IT) ........................ 102022000001631

(51) Int. Cl.
*B65C 3/20* (2006.01)

(52) U.S. Cl.
CPC ..................................... *B65C 3/20* (2013.01)

(58) Field of Classification Search
CPC .... B65C 3/20; B65C 9/22; B65C 9/00; B65C 9/1807; B65C 9/04; B65C 9/1892; B65B 61/025; B65B 61/202
(Continued)

(56) References Cited

U.S. PATENT DOCUMENTS 4,236,305 A * 12/1980 Hetherington ........ A47J 45/065 53/585
7,490,773 B2 * 2/2009 McVicker .............. G06V 10/10 235/462.24
(Continued)

FOREIGN PATENT DOCUMENTS

DE 10 2004 056343 A1 5/2006
GB 1 108 002 A 3/1968

OTHER PUBLICATIONS

European Patent Office, International Search Report and Written Opinion issued Dec. 22, 2022, which pertains to PCT Application No. PCT/EP2022/075164. 8 pgs.

*Primary Examiner* — Sameh Tawfik
(74) *Attorney, Agent, or Firm* — THOMPSON HINE LLP

(57) ABSTRACT

A machine for applying safety strips to the upper part of containers. The machine has, along a container advancement path, at least one application station which includes at least one application assembly provided with at least one crimping device which includes a first pad, designed to make contact, with a working face thereof, with a first end of the safety strip applied to the corresponding container at a transfer station, and a second pad, which is provided, on its working face, with at least one suction port, for the removable retention of a second end of the safety strip; each application assembly includes a respective suction device which is connected to the suction port of the corresponding second pad.

9 Claims, 7 Drawing Sheets

(58) Field of Classification Search
USPC .......................................................... 53/128.1
See application file for complete search history.

(56) References Cited

U.S. PATENT DOCUMENTS

| | | | | |
|---|---|---|---|---|
| 8,854,213 | B2 * | 10/2014 | Adstedt .................. | B65D 39/00 340/572.8 |
| 10,569,919 | B2 * | 2/2020 | Reiniger ............... | B65B 61/025 |
| 2004/0007557 | A1 * | 1/2004 | Maliszewski ............. | B65C 7/00 215/386 |
| 2006/0120752 | A1 * | 6/2006 | McVicker .......... | H04N 1/00795 399/361 |
| 2012/0011807 | A1 * | 1/2012 | Preckel ................. | B65B 61/025 53/167 |
| 2014/0331604 | A1 * | 11/2014 | Kuehl ....................... | B65C 7/00 53/410 |
| 2023/0043141 | A1 * | 2/2023 | Bardini ..................... | B65C 9/04 |

* cited by examiner

MACHINE FOR APPLYING SAFETY STRIPS TO THE UPPER PART OF CONTAINERS

TECHNICAL FIELD

The present invention relates to a machine for applying safety strips to the upper part of containers.

BACKGROUND

It is known to apply on the top part of containers such as bottles, jars, or the like, and more particularly on their closing elements, adhesive safety strips, constituted by excise stamps or warranty labels, commonly called "tamper-evident seals," which allow to indicate, through their breakage, a previous opening or tampering of said container.

Machines that allow to apply automatically the safety strips so as to straddle the closing elements of containers are also known.

In particular, machines of this type are known which have a rotating carousel, provided peripherally with resting plates for the individual containers, above which operate respective retention heads, integral with the movement of the carousel and designed to engage in the upper region the corresponding containers in order to keep them resting on the respective resting plates.

A transfer station is arranged around the carousel and transfers a respective safety strip to the individual containers in transit on the conveyor, arranged substantially vertically, by making a first end of the safety strip, located in a lower region, adhere to a first lateral portion of the container, located at the top of said container, and by making a second end of the safety strip adhere to the retention head that acts on said container.

Again, peripherally to the carousel, a star conveyor for the exit of the containers from the carousel is provided downstream of the transfer station and an application station is present thereat and is designed to complete the application of the safety strips to the respective containers.

In particular, the application station is provided with application assemblies, which are designed to act each on an individual container picked up from the output star conveyor and are movable integrally with said output star conveyor, so as to follow the containers in the portion of their advancement path defined by the output star conveyor.

Each application assembly comprises a respective crimping device which allows to perform the adhesion of the second end of the safety strip to a second lateral portion of the container located on the side opposite to the first lateral portion of the container on which the first end of said safety strip is already applied by the transfer station.

In particular, the crimping device of each application assembly comprises a pair of pads, respectively a first pad and a second pad, each intended to engage a respective end of the sealing strip and movable so as to oscillate on command with respect to each other in order to make the second end of the safety strip adhere to the second lateral portion of the container.

More specifically, the first pad is designed to face, with a working face, the first lateral portion of the container, so as to engage the first end of the safety strip, so as to keep it pressed against the first lateral portion of the container.

The second pad is instead designed to engage, with a working face, the second end of the safety strip and can be actuated rotationally, with respect to the first pad, about a rotation axis, which is oriented substantially transversely to the advancement path of the containers and is eccentrically axially offset, with respect to the longitudinal axis of the second pad, in order to allow the second pad to pick up, by means of a first oscillating motion about its own rotation axis, the second end of the safety strip from the retention head that acts on the associated container, and to transport the second end of the safety strip toward the second lateral portion of the container, by means of a second oscillating motion, around its rotation axis, performed by the second pad after the first oscillating motion and after the corresponding container has left the carousel, carried by the output star conveyor, with spacing of the container from the corresponding retention head, so as to achieve the adhesion of the second end of the safety strip to the second lateral portion of the container.

In order to allow the retention by the second pad of the second end of the safety strip in adhesion against its working face, during the pickup of the second end of the safety strip from the retention head and its subsequent transfer onto the second portion of the container, the second pad of the crimping device of each application assembly is provided, on its own working face, with at least one air suction port connected to a suction circuit which operates at a pressure that is lower than atmospheric pressure.

More particularly, in current machines the suction port provided on the second pad of the crimping device of each application assembly present in the application station can be connected, by means of a respective suction duct, to a vacuum distribution unit, shared by all the application assemblies, which communicates with a single vacuum generator, which allows, by virtue of the vacuum distribution unit, to place at a pressure that is lower than atmospheric pressure, the suction ducts of the application assemblies, as a consequence of their connection to the vacuum distribution unit, during the transit of the respective application assemblies at the vacuum distribution unit, so as to create an air suction from the outside toward the inside of the suction ducts, through the corresponding suction ports, and thus allow the retention of the second end of the safety strip on the second pad of the crimping devices.

The drawback of this solution resides in that since the suction ducts are in partial vacuum, said suction ducts, in addition to the various elements that allow their connection to the vacuum generator and in addition to the vacuum generator itself, can fill easily with dirt and therefore become clogged, forcing to perform laborious interventions for cleaning or for the search and replacement of the clogged parts.

Furthermore, in this solution, since there is a single vacuum generator which is connected to the suction ports of the second pads of the various application assemblies, if the safety strip on a container and therefore on the corresponding retention head is not present because it was not delivered at the transfer station, the suction port of the second pad that corresponds to the application assembly designed to operate on the container without the safety strip, being in any case connected to the vacuum generator during the movement of the application assemblies, without however being closed by the missing safety strip, produces the presence of an opening in the suction circuit which creates a loss of vacuum at the suction ports of the second pads of the other application assemblies that operate at the same time on the corresponding containers and are, therefore, connected to the vacuum distribution unit, with consequent reduction of the attraction force applied by the suction ports of the second pads of the other application assemblies.

SUMMARY

The aim of the present invention is to provide a machine for applying safety strips to the upper part of containers that is capable of improving the background art in one or more of the above-mentioned aspects.

Within this aim, an object of the invention is to provide a machine for applying safety strips to the upper part of containers that is capable of limiting the problem of clogging in the circuit connected to the suction ports of the second pads of the crimping devices.

Another object of the invention is to provide a machine for applying safety strips to the upper part of containers that allows to prevent, in the absence of the safety strip at the container on which the second pad of an application assembly operates, the occurrence of losses of vacuum in the suction ports of the second pads of the other application assemblies.

A further object of the invention is to provide a machine for applying safety strips that is more efficient than the background art in the creation of vacuum at the suction port of the second pads of the application assemblies.

Another object of the invention is to devise a machine for applying safety strips to the upper part of containers that is capable of giving the greatest assurances of reliability and safety in its operation.

Another object of the invention is to devise a machine for applying safety strips to the upper part of containers that has a relatively simple structure.

A still further object of the present invention is to overcome the drawbacks of the background art in a manner that is alternative to any existing solutions.

Not least object of the invention is to provide a machine for applying safety strips to the upper part of containers that can be competitive also from a purely economic standpoint.

This aim and these and other objects that will become better apparent hereinafter are achieved by a machine for applying safety strips to the upper part of containers according to claim 1, optionally provided with one or more of the characteristics of the dependent claims.

BRIEF DESCRIPTION OF THE DRAWINGS

Further characteristics and advantages of the invention will become better apparent from the description of a preferred but not exclusive embodiment of the machine for applying safety strips to the upper part of containers according to the invention, illustrated by way of non-limiting example in the accompanying drawings, wherein.

DETAILED DESCRIPTION

Figure 1:
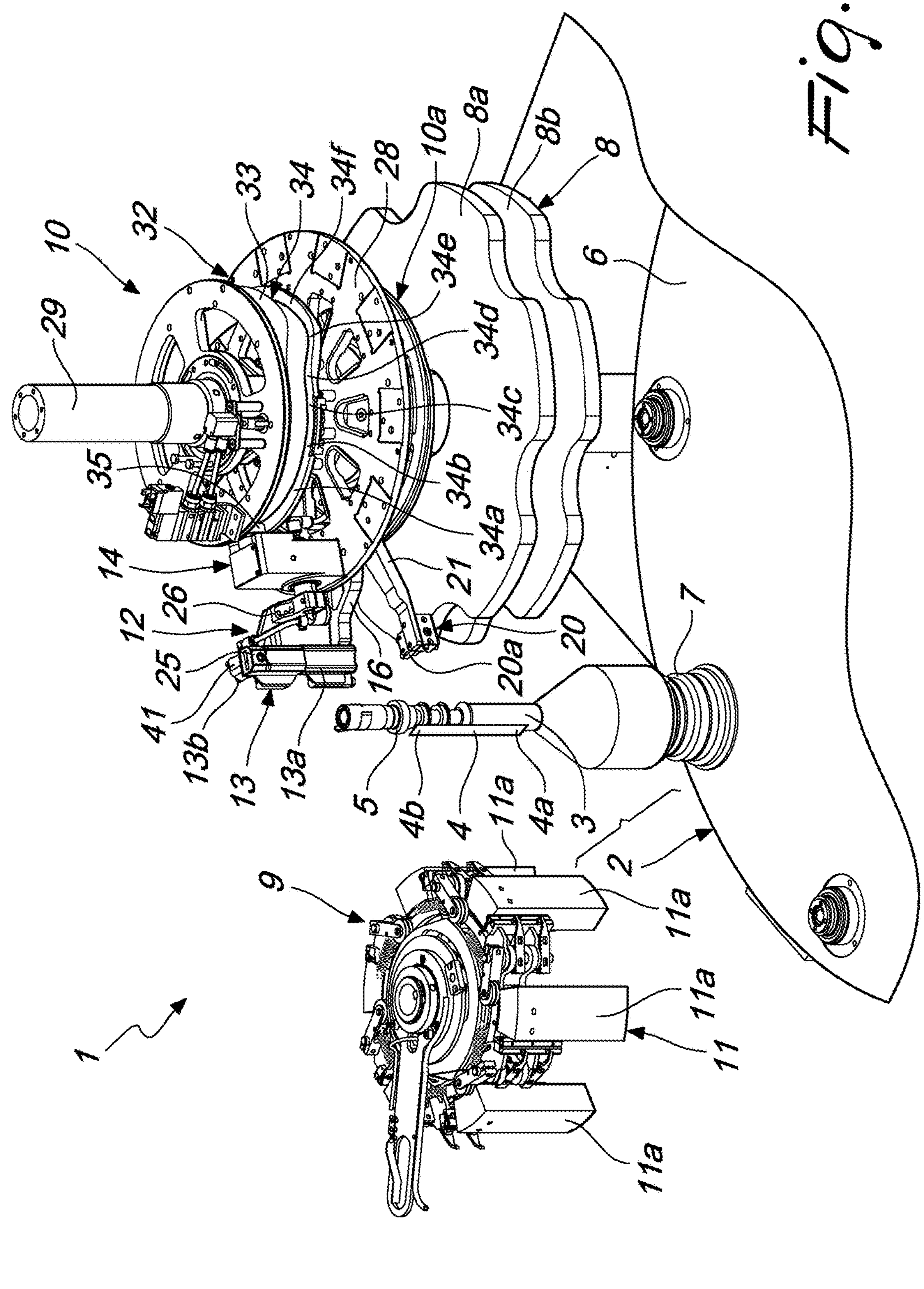
FIG. 1 is a perspective view of the machine according to the invention.
Figure 2:
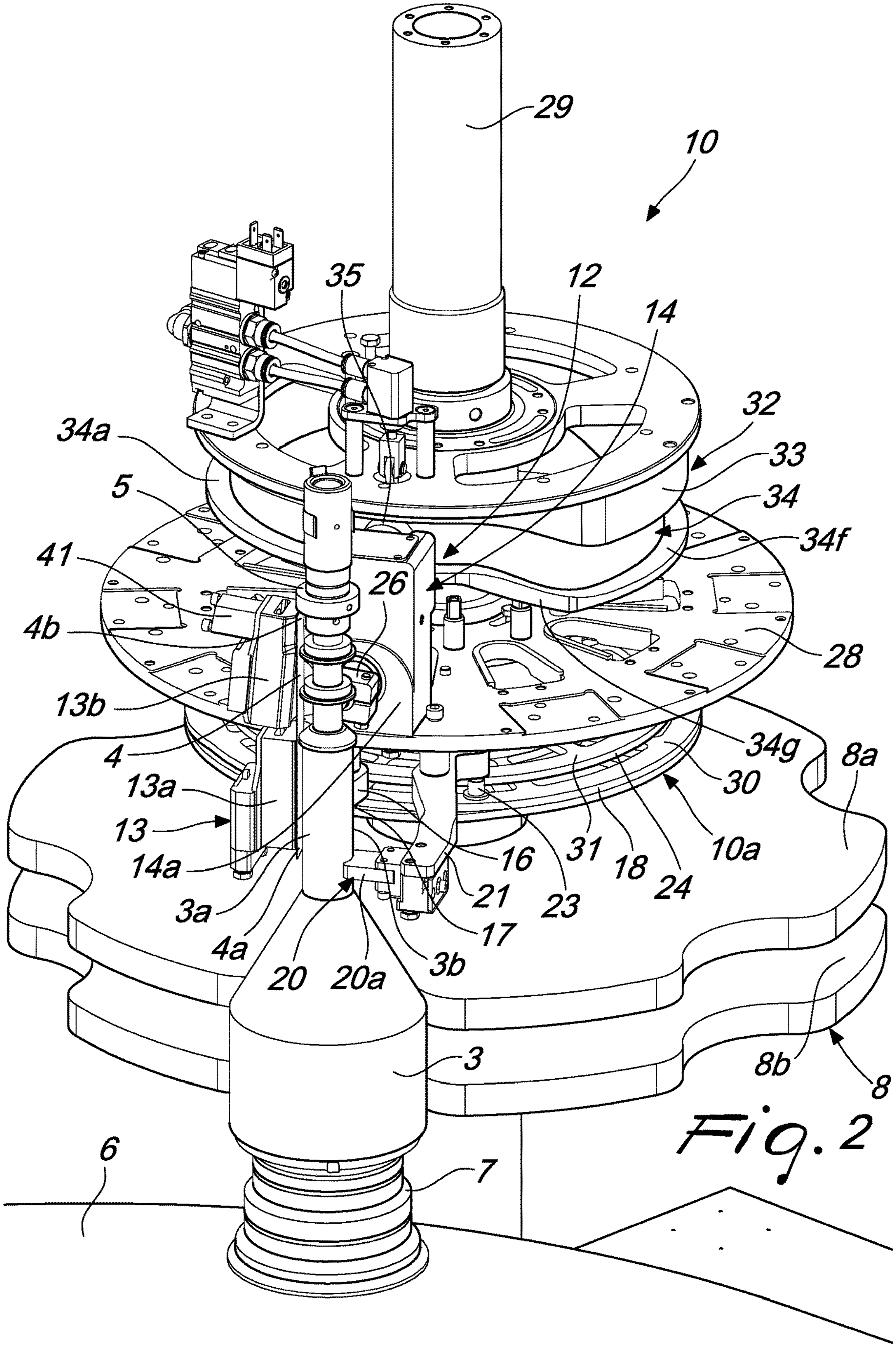
FIG. 2 is a perspective view of an application station of the machine according to the invention.
Figure 3:
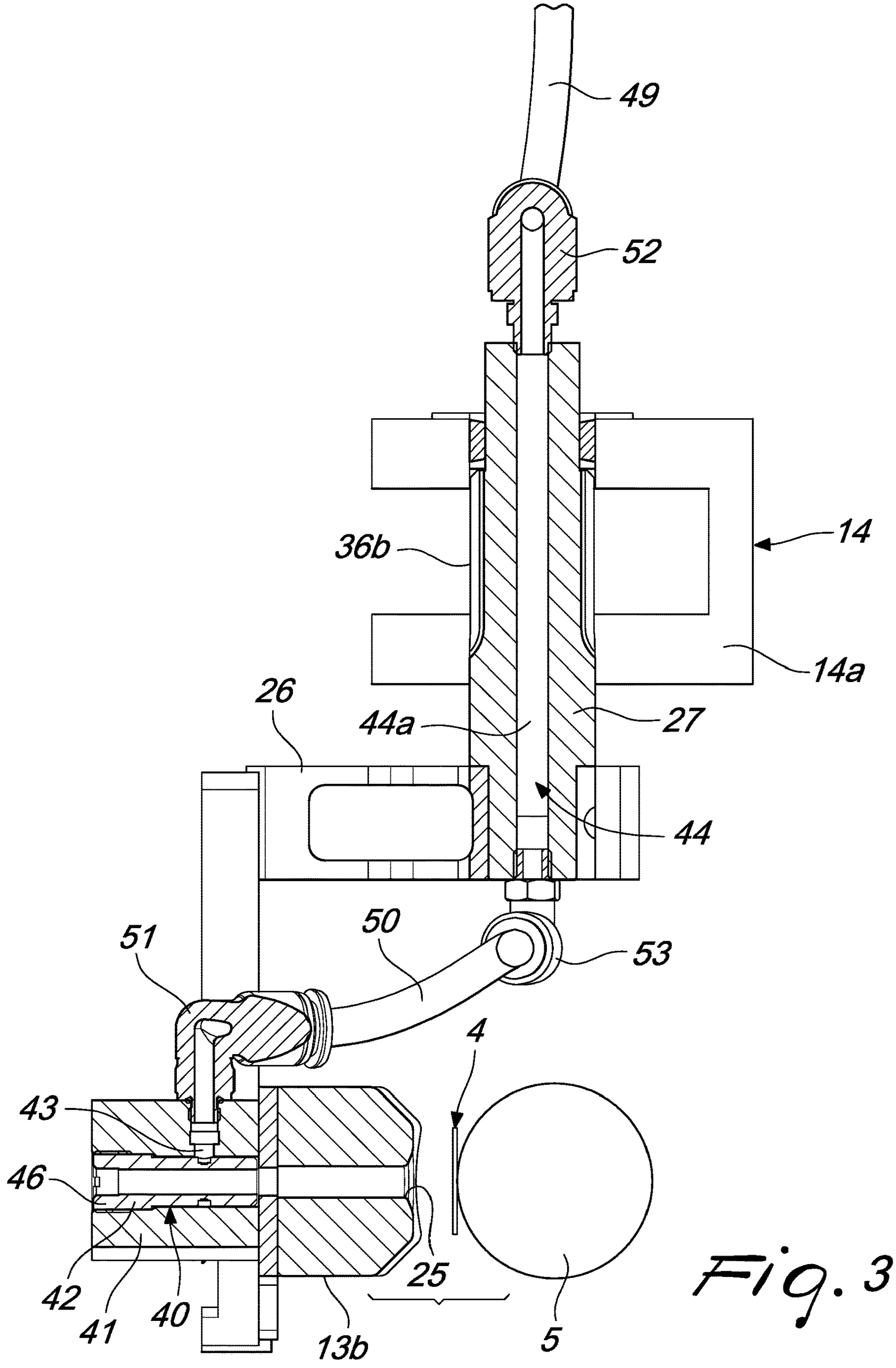
FIG. 3 is a sectional top plan view of an application assembly of the application station, with parts omitted for the sake of simplicity.
Figure 4:
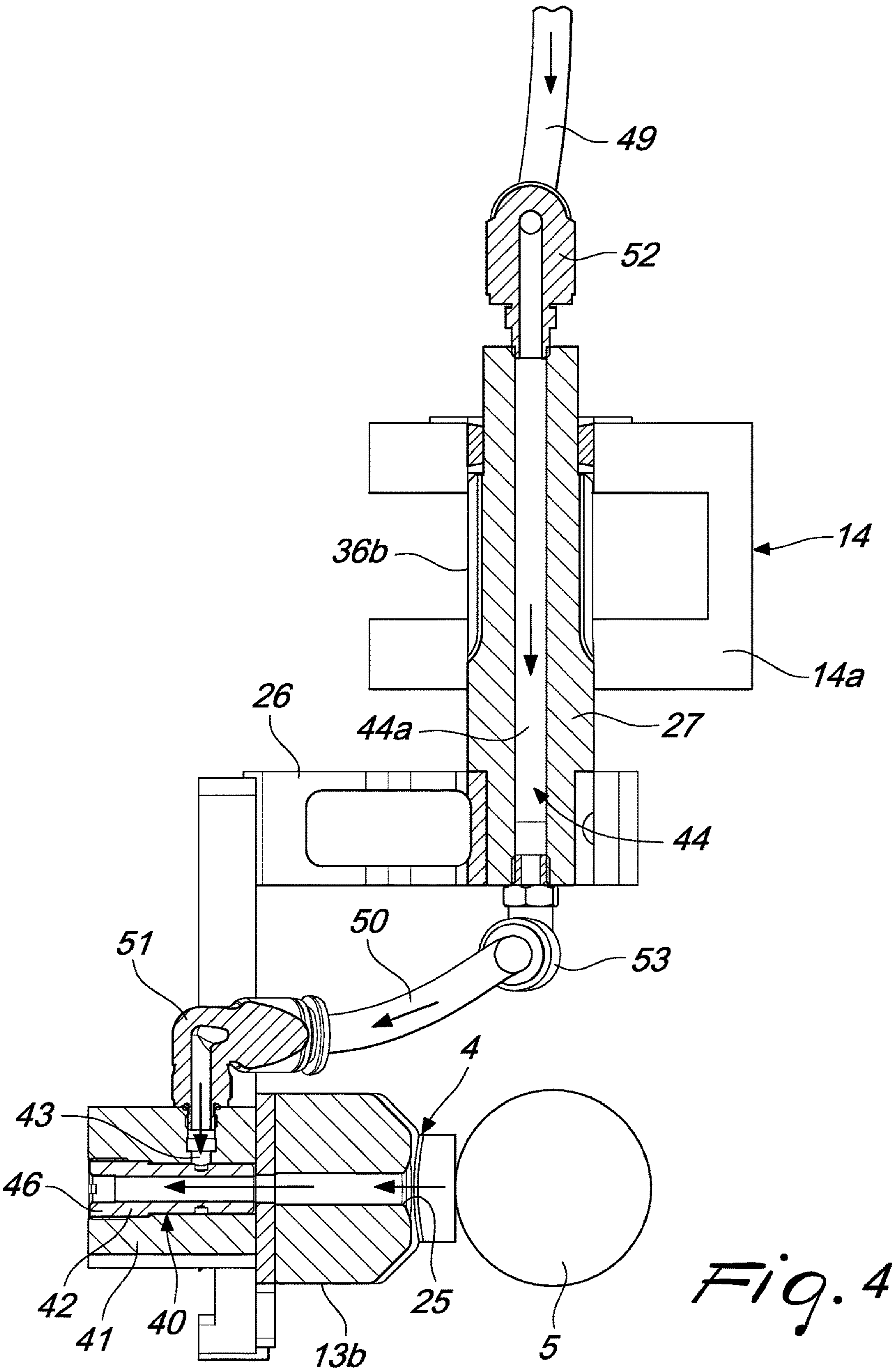
FIG. 4 is a view similar to FIG. 3 but with a safety strip in adhesion against the working face of a second pad of the application assembly.
Figure 5:
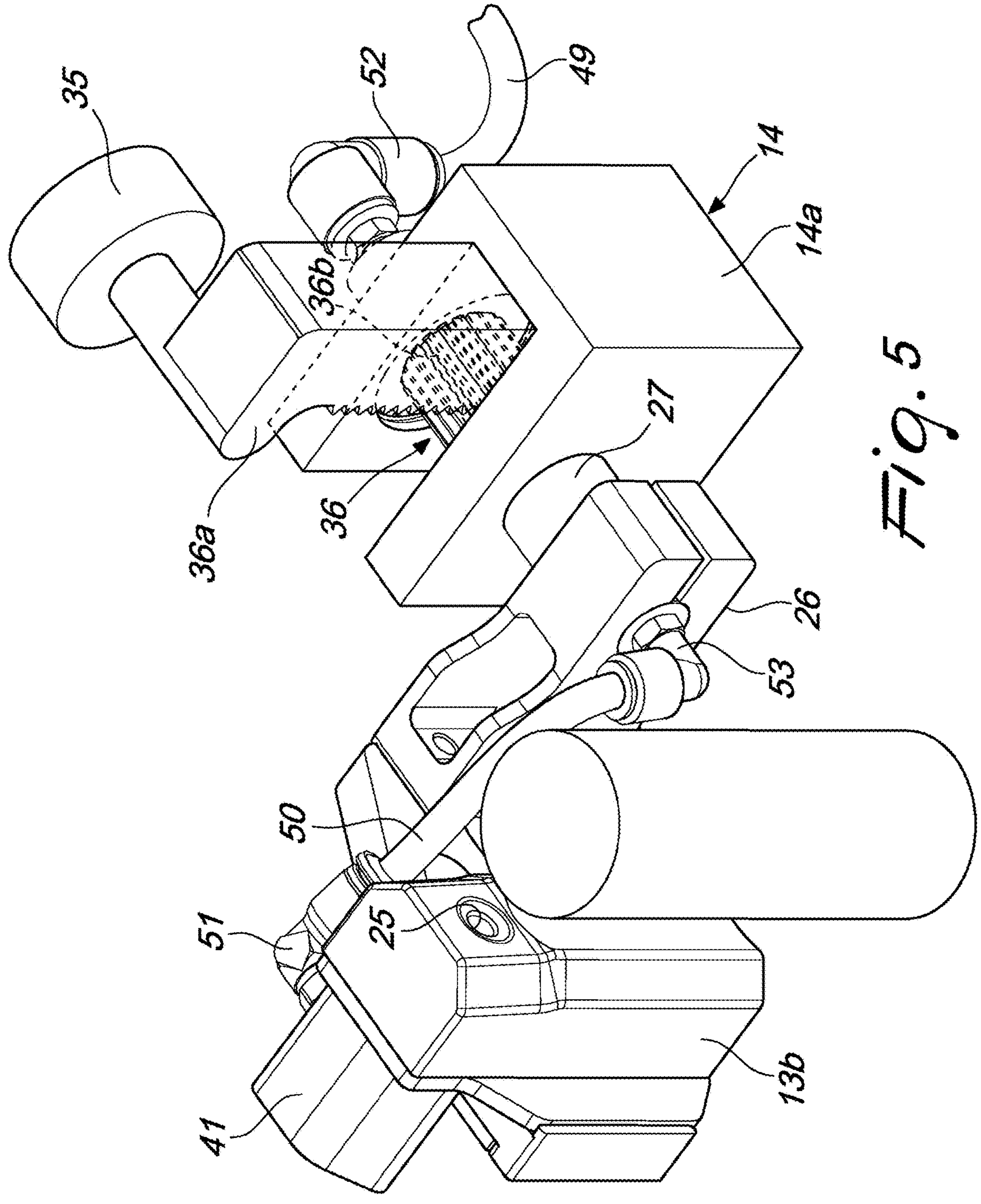
FIG. 5 is a perspective view of a portion of the application assembly.
Figure 6:
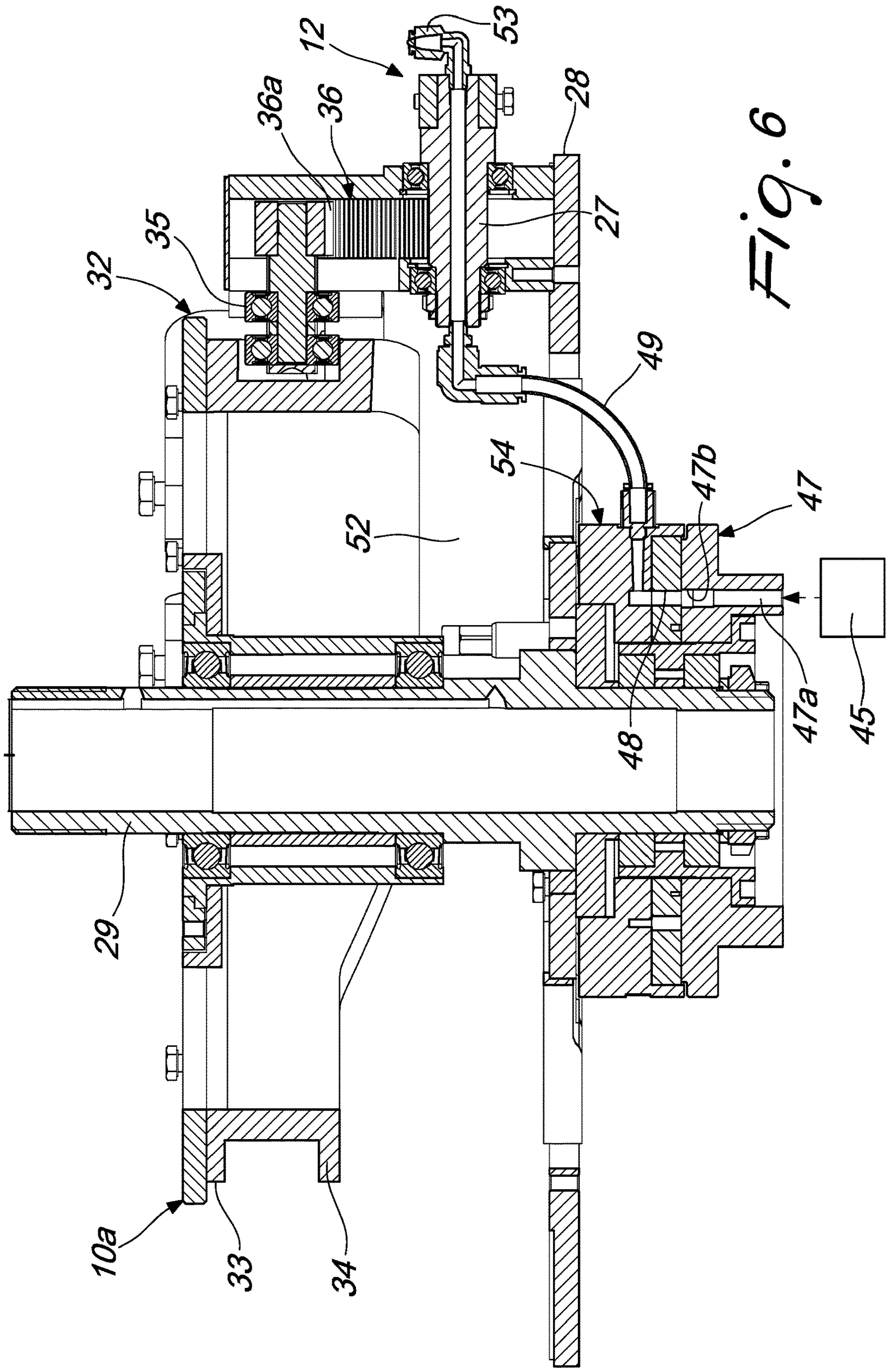
FIG. 6 is a sectional view of the application station.
Figure 7:
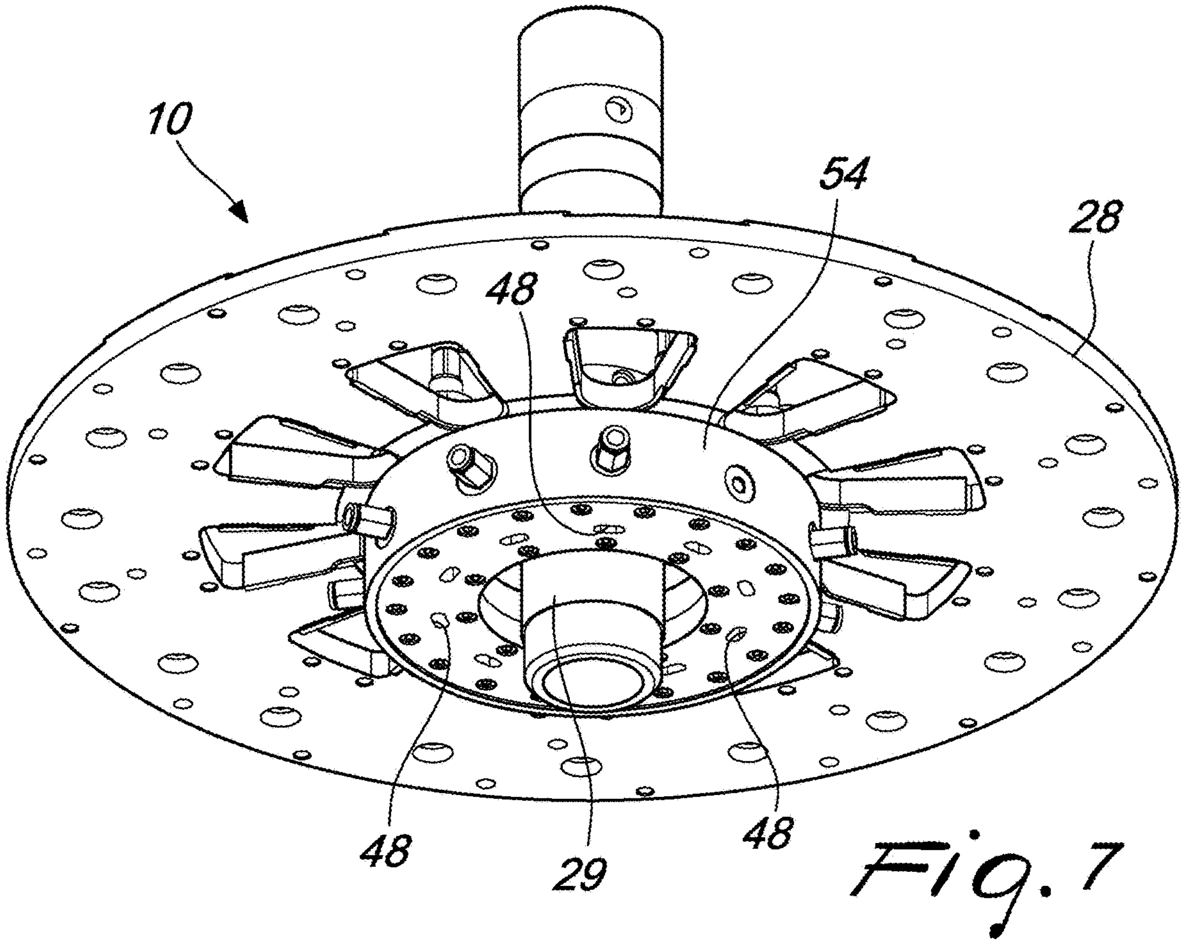
FIG. 7 is a perspective view from below of a portion of the application station.
Figure 8:
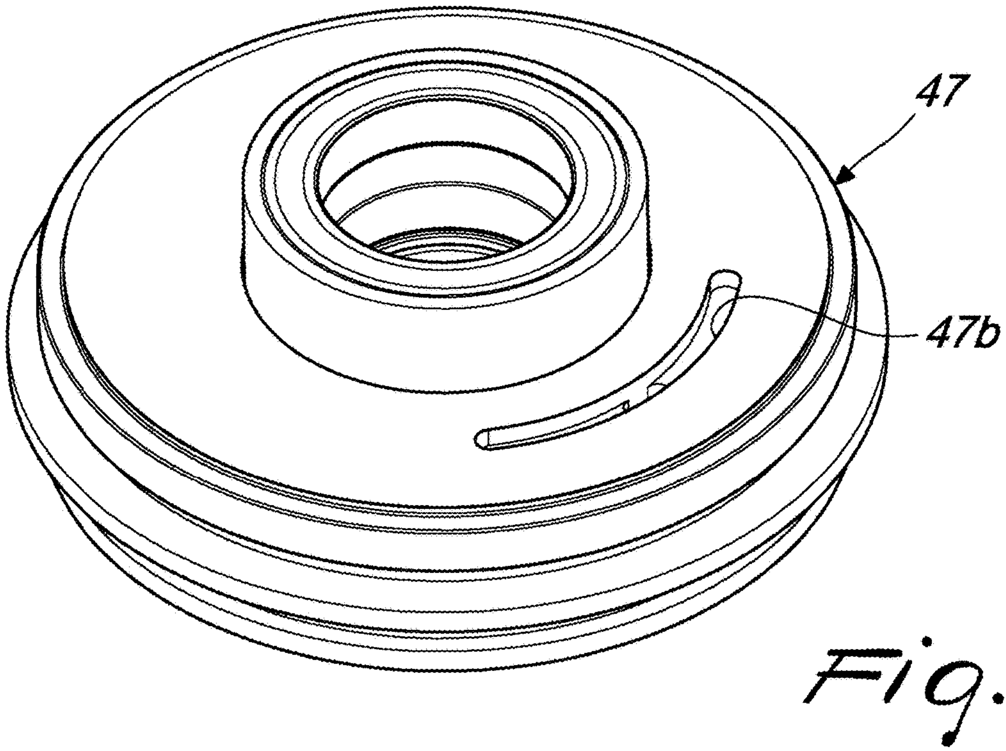
FIG. 8 is a perspective view of a pressurized air distribution unit of the application station.

With reference to the figures, the machine for applying safety strips to the upper part of containers according to the invention, generally designated by the reference numeral 1, comprises means 2 that allow to convey, along an advancement path, the containers 3, on the upper part of which respective safety strips 4 are designed to be applied.

The conveyance means 2 have retention heads 5 designed to act in an upper region on the containers 3 for at least a portion of their advancement path.

More particularly, the conveyance means 2 comprise, as in the illustrated example, a rotating carousel 6 provided, at its peripheral region, with one or more supporting plates 7, each designed to receive, by resting, a single container 3, and above which respective retention heads 5 operate and engage the top of the container 3 arranged on the underlying supporting plate 7, in order to ensure that it continues to rest on said supporting plate.

The supporting plates 7 can be advantageously actuated rotationally about their axes in order to rotate the corresponding containers 3, so as to be able to vary their orientation about their vertical axis.

Conveniently, the conveyance means 2 comprise, moreover, an output star conveyor 8, which is movable rotationally about its own axis and is designed to pick up the containers 3 that arrive from the carousel 6, in order to move them away from said carousel.

For example, the output star conveyor 8 is constituted by two disk-like bodies 8*a*, 8*b*, which are mutually superimposed and coaxial, so as to engage different regions of the containers 3, and are contoured at their peripheral region to form the receptacles of the output star conveyor 8.

At least one transfer station 9, which allows to transfer a respective safety strip 4 to the incoming containers 3, and at least one application station 10, which allows to complete the application of the safety strip 4 to the containers 3, are arranged in mutual succession along the advancement path of the containers 3 defined by the conveyance means 2.

In particular, the transfer station 9 is arranged laterally to the carousel 6 and is structured to transfer a respective safety strip 4 which is arranged substantially vertically onto the upper part of the containers 3, applying a first end 4*a*, which is arranged in a lower region, of the safety strip 4 onto a first lateral portion 3*a* of the corresponding container 3 and a second end 4*b*, which is arranged in an upper region, of the safety strip 4 on the retention head 5 that acts on the corresponding container 3.

More particularly, the transfer station 9 comprises a transfer element constituted by a drum 11, which can rotate about a substantially vertical axis and is designed to receive from a magazine, not shown, the safety strips 4, on transfer portions 11*a*, formed along its lateral surface, and to subsequently transfer the received safety strips 4 to the containers 3 that transit on the carousel 6.

The safety strips 4 can be of the pre-adhesive type or are provided with adhesive on their face designed to be applied to the containers 3, by virtue of adhesive application means, arranged laterally to the drum 11 and constituted, for example by an adhesive application roller, not shown.

The application station 10 comprises at least one application assembly 12, which can move, with respect to a fixed supporting structure 10*a* of the application station 10, substantially parallel to at least one portion of the advancement path of the containers 3 and in a manner which is synchronized with the movement of said containers on the conveyance means 2, in order to allow each application assembly 12 to follow a respective container 3 while said container moves along said portion of its advancement path.

Advantageously, the application station 10 is arranged at the output star conveyor 8 and in particular each application assembly 12 is movable with respect to the fixed structure 10*a* of the application station 10, with a motion that is synchronized with the movement of the output star conveyor 8, so as to be able to follow the containers 3 while they are moved by the output star conveyor 8.

In greater detail, each application assembly 12 performs, with respect to the fixed structure 10*a* of the application station 10, a movement that is synchronized with the movement of the output star conveyor 8 and extends along a closed path around the axis of the output star conveyor 8.

More particularly, each application assembly 12 is moved along a circular trajectory centered on the axis of the output star conveyor 8 so that each application assembly can perform a movement that is substantially parallel to the circular movement performed by the receptacles 8*a* of the output star conveyor 8.

Conveniently, for each receptacle 8*a* of the output star conveyor 8 it is possible to provide a respective application assembly 12, so that each container 3 that arrives from the carousel 6 and is received by the output star conveyor 8, can be taken by a respective application assembly 12.

In this manner, each application assembly 12, in its movement about the axis of the output star conveyor 8, meets the respective container 3 at the region in which the container 3, still resting on the corresponding supporting plate 7 of the carousel 6 and engaged with the corresponding retention head, begins to enter the corresponding receptacle 8*a* of the output star conveyor 8 and subsequently follows the respective container 3, performing at the same time thereon the completion of the application of the safety strip 4 that said container received from the transfer station 9, while the container 3 covers the portion of its advancement path that is defined by the output star conveyor 8 and progressively makes the container 3 leave the carousel 6.

In detail, each application assembly 12 has at least one respective crimping device 13, which comprises at least one pair of pads 13*a*, 13*b*, each designed to engage a respective end of the safety strip 4 that is present on the respective container 3, said pads being movable with respect to each other, in order to pick up the second end 4*b* of the safety strip 4 from the retention head 5 that acts on the respective container 3 and thus make it adhere to a second lateral portion 3*b* of the corresponding container 3, which is opposite to the first lateral portion 3*a*, so as to arrange the safety strip 4 so that is straddles the upper part of the container 3.

Advantageously, the crimping device 13 of each application assembly 12 is conveniently supported, at least partially, by a supporting body 14, which is mounted so that it can move, with respect to the fixed structure 10*a* of the application station 10, around the axis of the output star conveyor 8.

Conveniently, motion transmission means are provided which allow to connect kinematically the output star conveyor 8 to the supporting body 14 of each application assembly 12, so that the movement of the supporting body 14 of each application assembly 12 about the axis of the output star conveyor 8 is integral with the rotation movement of said output star conveyor.

In greater detail, the crimping device 13 of each application assembly 12 comprises a first pad 13*a*, designed to make contact, with a working face thereof, with the first end 4*a* of the safety strip 4 applied to the corresponding container 3.

The first pad 13*a* of the crimping device 13 of each application assembly 12 is connected to the supporting body 14 of the corresponding application assembly 12 so as to be able to perform, with respect to the supporting body 14, a movement toward or away from the region designed to be occupied by the corresponding container 3.

In particular, the first pad 13*a* is connected to the free end of a first lever arm 16 mounted rotatably, with respect to the supporting body 14 of the corresponding application assembly 12, about a respective oscillation axis that is substantially parallel to the axis of the output star conveyor 8, so that the first pad 13*a* can pass from a retracted position, in which it is spaced from the region designed to be occupied by the corresponding container 3, in order to allow said container to enter and exit from the respective receptacle 8*a* of the output star conveyor 8, to an advanced position, in which the first pad 13*a* is moved closer to the region designed to be occupied by the corresponding container 3, so as to be able to contact the first end 4*a* of the safety strip 4 applied to the first lateral portion 3*a* of the corresponding container 3, and vice versa.

The rotational actuation of the first lever arm 16 about the corresponding oscillation axis, which allows the transition of the first pad 13*a* between the retracted position and the advanced position, is provided by means of the sliding engagement of a first cam follower roller 17, arranged at the end of the first lever arm 16 that is opposite to the one connected to the first pad 13*a*, with a first cam-like profile 18 formed on the fixed structure 10*a* of the application station 10 and contoured so as to impart to the first lever arm 16 a rotation in the direction that moves the first pad 13*a* from the advanced position to the retracted position, in contrast with first elastic return means 19, which act between the first lever arm 16 and the supporting body 14 of the corresponding application assembly 12, during the movement of the corresponding application assembly 12 about the axis of the output star conveyor 8.

Advantageously, the first pad 13*a* acts on the corresponding container 3, in cooperation with a respective abutment element 20, also comprised in the corresponding application assembly 12, which is in turn designed to be engaged against the side of the container 3 that is opposite to the one on which the first pad 13*a* acts, so that the container 3 taken by each application assembly 12 is clamped between the first pad 13*a* and the abutment element 20.

Conveniently, the abutment element 20 comprises a pad body 20*a* supported at the free end by a second lever arm 21, which is mounted so that it can rotate, with respect to the supporting body 14 of the respective application assembly 12, about a corresponding oscillation axis that is substantially parallel to the axis of the output star conveyor 8.

In particular, the second lever arm 21 can be actuated rotationally about its own oscillation axis in order to produce, in contrast with elastic return means 22, that act between the second lever arm 21 and the supporting body 14 of the corresponding application assembly 12, the spacing of the corresponding pad body 21*a* from the respective container 3, due to the sliding engagement of a second cam follower roller 23, which is arranged at the end of the second lever arm 21 that is opposite to the one in which the abutment element 20 is present, with a second cam-like profile 24, also defined on the fixed structure 10*a* of the application station 10.

The crimping device 13 of each application assembly 12 comprises, moreover, a second pad 13*b*, which is provided, on its working face, with at least one suction port 25 for the removable retention of the second end 4*b* of the safety strip 4.

In particular, the second pad 13*b* can move so as to oscillate with respect to the first pad 13*a* about a rotation axis, which is arranged substantially transversely to the advancement path of the containers 3, in order to allow the second pad 13*b*, by means of a first oscillating motion, about its own rotation axis, to remove the second end 4*b* of the safety strip 4 from the retention head 5 that acts on the corresponding container 3 and, by means of a second oscillating motion about its rotation axis, performed after the first oscillating motion, to move it to adhere to the second lateral portion 3*b* of the corresponding container 3, while the first pad 13*a* acts on the first end 4*a* of the safety strip 4, as will be explained in greater detail hereinafter.

More particularly, the rotation axis of the second pad 13*b* is conveniently oriented substantially at right angles to the axis of the output star conveyor 8 and is arranged so as to be eccentrically offset with respect to the axis of extension of the second pad 13*b* and in a position that substantially passes through the vertical axis of the region designed to be occupied by the corresponding container 3 and by the corresponding retention head 5, so as to allow the second pad 13*b* to perform a movement around the upper part of the container 3.

Conveniently, the second pad 13*b* is supported at the free end of a lever element 26, which in turn is connected rotatably, at its other end, to the supporting body 14 of the corresponding application assembly 12, by means of an oscillation shaft 27, which defines, with its axis, the rotation axis of the second pad 13*b* and is oriented, in particular, substantially radially with respect to the axis of the output star conveyor 8.

As in the illustrated embodiment, it is possible, advantageously the supporting body 14 of each application assembly 12 can comprise a block 14*a*, which supports rotatably the oscillation shaft 27 and is fixed to the peripheral region of an annular plate 28, which is mounted axially, integrally in rotation, with respect to an actuation shaft 29, which is extended substantially vertically and rotates about its own axis.

The output star conveyor 8 is integrally keyed, below the annular plate 28, around the actuation shaft 29.

Conveniently, the first lever arm 16 and the second lever arm 21 are hinged, with an intermediate portion thereof, to the annular plate 28, so that they can rotate about the respective oscillation axes, proximate to the block 14*a* of the corresponding application assembly 12, while the first and second cam-like profiles 18 and 24 are defined along the external edge of the respective supporting plates 30 and 31, which are arranged below the annular plate 28, are crossed centrally by the actuation shaft 29 and are integral with the fixed structure 10*a* of the application station 10.

In greater detail, the second pad 13*b* is capable of assuming at least two extreme positions which are mutually angularly spaced about its rotation axis, respectively an inactive or standby position and an application position.

In particular, in the inactive position the second pad 13*b* is arranged above the first pad 13*a* and is arranged with its own working face directed toward the same direction as the working face of the first pad 13*a*.

More particularly, the second pad 13*b* is in the inactive position when the corresponding container 3, once it has reached the output star conveyor 8, is taken by the corresponding application assembly 12, so that the second pad 13*b* can face, with its working face, the retention head 5 still acting on the container 3.

In the application position, which is assumed by the second pad 13*b* after the corresponding container 3 has left the carousel 6, with consequent motion away from the corresponding retention head 5, the second pad 13*b* is rotated substantially through 180°, about its rotation axis, with respect to the inactive position, so that its working face is directed toward the working face of the first pad 13*a* and the second pad 13*b* is located on the side of the corresponding container 3 that is opposite to the one in which the first pad 13*a* is located and with its working face facing the second lateral portion 3*b* of the container 3, in order to be able to thus transfer the second end 4*b* of the safety strip 4 onto the second lateral portion 3*b* of the corresponding container 3.

In particular, during the path of the corresponding container 3 on the output star conveyor 8, the second pad 13*b* performs in sequence said first and second oscillating motions about its rotation axis.

More particularly, the second pad 13*b* performs the first oscillating motion when the corresponding container 3 is still engaged by the respective retention head 5 on the carousel 6, while it performs the second oscillating motion after the corresponding container 3 has left the carousel 6, being freed from the engagement with the corresponding retention head 5.

In practice, the first oscillating motion consists of two successive rotations of the second pad 13*b* about its own rotation axis, one in one direction and the other in the opposite direction, according to a rotation angle such as to allow the second pad 13*b* to pass, with the rotation in one direction, from the inactive position, where it is when the corresponding container 3 is received by the receptacle 8*a* of the output star conveyor 8 with which its application assembly 12 is associated, to a pick-up position, located between the inactive position and the application position, in which the second pad 13*b* is moved closer to the retention head 5 of the corresponding container 3, so that the second end 4*a* of the safety strip 4, which is applied to the retention head 5, makes contact with the working face of the second pad 13*b*, so as to be retained on the working face of the second pad 13*b* by virtue of the action of the suction port 25.

The rotation in the opposite direction of the first oscillating motion allows the second pad 13*b* to return subsequently from the pick-up position to the inactive position, so that the second end 4*b* of the safety strip 4, by remaining retained on the working face of the second pad 13*b*, again due to the action of the suction port 25, can be picked up by the second pad 13*b* and moved away, therefore, from the retention head 5 of the corresponding container 3, before said container 3 leaves the carousel 6 and is freed from engagement with the retention head 5.

The second oscillating motion performed by the second pad 13*b* consists, in turn, of two successive rotations, substantially through 180°, performed by the second pad 13*b*, one in one direction and the other one in the opposite direction, about its rotation axis, after the corresponding container 3 has left the carousel 6.

In particular, in the second oscillating motion the second pad 13*b* passes, by turning in one direction, from the inactive position, in which the second pad 13*b* is, after the first oscillating motion, with the second end 4*b* of the safety strip 4 retained on its working face, to the application position, so that the second pad 13*b* can move the second end 4*b* of the safety strip 4 to adhere to the second lateral portion 3*b* of the container 3.

Also, in the second oscillating motion, by means of the rotation in the opposite direction the second pad 13*b* returns, after the deactivation of the corresponding suction port 25, from the application position to the inactive position, leaving the second end 4*b* of the safety strip 4 in adhesion on the second lateral portion 3*b* of the corresponding container 3, so as to be ready to work on another container 3 that arrives from the carousel 6 in the corresponding receptacle 8*a* of the output star conveyor 8.

Conveniently, the second pad 13*b* is kinematically connected to a cam-based actuation device 32 which is contoured so as to impart the first oscillating motion and the second oscillating motion to the second pad 13*b* to perform as a consequence of the movement of the corresponding application assembly 12 with respect to the fixed structure 10*a* of the application station 10.

In greater detail, the cam-based actuation device 32 is formed on a cylindrical side wall 33, which is integral with the fixed structure 10*a* of the application station 10 and is arranged substantially coaxially to the axis of the output star conveyor 8, preferably in a position that lies above the annular plate 28.

More particularly, the cam-based actuation device 32 comprises a sliding guide 34, which extends along the external surface of the cylindrical side wall 33 and is engaged by a follower roller 35, which is functionally connected to the lever element 26 by virtue of kinematic motion conversion means 36, so that strokes between mutually different heights imposed on the follower roller 35 by the shape of the sliding guide 34 result in rotational movements of the lever element 26 about the axis of the oscillation shaft 27 and, therefore, of the second pad 13*b* about its rotation axis.

Advantageously, the kinematic motion conversion means 36 comprise a rack 36*a*, with a substantially vertical axis, which is mounted so that it can translate along its axis, with respect to the supporting body 14 of the corresponding application assembly 12, and supports rotatably, at an upper end thereof, the follower roller 35. The rack 36*a* engages with its teeth a pinion 36*b*, which is fixed integrally in rotation about the axis of the oscillation shaft 27.

In particular, the sliding guide 34 has flat portions, which extend on substantially horizontal planes, the sliding engagement of which by the follower roller 35, during the movement of the corresponding application assembly 12 about the axis of the output star conveyor 8, does not produce any angular movement of the second pad 13*b*, with respect to the first pad 13*a*, about its rotation axis, and portions with an extension that is inclined upward or downward with respect to the horizontal and the sliding engagement of which by the follower roller 35, during the movement of the corresponding application assembly 12 about the axis of the output star conveyor 8, causes height variations of the follower roller 35 that produce translations, in one direction or another, of the rack 36*a*, causing the rotation, in one direction or another, of the pinion 36*b* and with it of the oscillation shaft 27 and therefore of the second pad 13*b*, with respect to the first pad 13*a*, about its rotation axis, thus allowing the execution of the first oscillating motion and of the second oscillating motion by the second pad 13*b*.

More particularly, the sliding guide 34 has, in mutual succession along the direction of movement of the follower roller 33 along the sliding guide 32: a first flat portion 34*a*, which is extended on a substantially horizontal plane arranged at a first height, the sliding engagement of which by the follower roller 35 causes the retention of the second pad 13*b* in the inactive position; a first descending inclined portion 34*b*, which is extended from the first height to a second height, lower than the first height, and a first rising inclined portion 34*c*, which is extended from the second height to the first height, the sliding engagement of which by the follower roller 35 produces the first oscillating motion of the second pad 13*b*, with consequent transition of the second pad 13*b* from the inactive position to the pick-up position, during the sliding of the follower roller 35 along the first descending inclined portion 34*b*, and from the pick-up position to the inactive position, during the sliding of the follower roller 35 along the first rising inclined portion 34*c*; a second planar portion 34*d* with an extension on a substantially horizontal plane arranged at the first height, the sliding engagement of which by the follower roller 35 causes the retention of the second pad 13*b* in the inactive position assumed after the first oscillating motion; a second descending inclined portion 34*e*, which extends from the first height up to a third height that is lower than the second height; a third planar portion 34*f*, with an extension on a substantially horizontal plane that is arranged at the third height, and a second rising inclined portion 34*g*, which extends from the third height up to the first height, connecting to the first flat portion 34*a*, the sliding engagement of which by the follower roller 35 produces the second oscillating motion of the second pad 13*b*, with transition of said second pad 13*b* from the inactive position to the application position, during the sliding of the follower roller 35 along the second descending inclined portion 34*e*, retention of the application position by the second pad 13*b*, during the sliding of the follower roller 35 along the third flat portion 34*f*, and finally the transition of the second pad 13*b* from the application position to the inactive position, during the sliding of the follower roller 35 along the second rising inclined portion 34*g*.

According to the invention, each application assembly 12 comprises a respective suction device 40, which is connected to the suction port 25 of the corresponding second pad 13*b*.

Advantageously, the suction device 40 of each application assembly 12 is constituted by a respective vacuum generator and is supported by the corresponding application assembly 12. More preferably, the suction device 40 of each application assembly 12 is mounted on the second pad 13*b* of the corresponding application assembly 12.

In particular, the suction device 40 of each application assembly 12 may be constituted, for example, by an electrically powered vacuum generator or vacuum pump, provided conveniently with a compressor actuated by a respective hydraulic motor and, preferably, mounted in axial alignment with the suction port 25 of the second pad 13*b* of the corresponding application assembly 12.

As an alternative, as in the embodiment shown in the figures, the suction device 40 of each application assembly may also be structured so as to be capable of generating an at least partial vacuum, or in any case a pressure lower than the atmospheric pressure, at the suction port 25 of the second pad 13*b* of the corresponding application assembly 12, utilizing, in order to generate said vacuum or partial vacuum, an air flow that is pressurized, for example by Venturi effect or Coanda effect.

In particular, in this case, the suction device 40 is constituted by a pneumatic or compressed-air vacuum generator and, more particularly, is fed by a pressurized air flow, in order to produce, by means of said air flow, for example by Venturi effect, a partial vacuum, with respect to the atmospheric pressure, at the suction port 25.

Advantageously, the suction device 40 of each application assembly 12 is supported by the corresponding second pad 13*b*, preferably in a removable manner, so as to allow easy access for its cleaning and optional replacement.

More particularly, according to the illustrated embodiment, the suction device 40 of each application assembly 12 is constituted by a vacuum generator based on the Venturi principle and is, conveniently, associated with a respective cartridge 41, fixed detachably to the corresponding second pad 13*b* on the side opposite to the corresponding working face.

Conveniently, the suction device 40 comprises a tubular suction element 42, which communicates axially, at one of its ends, with the corresponding suction port 25 and is connected radially, at a respective intake port 43, to at least one respective channel 44 for feeding pressurized air, which can be connected to a pressurized air generator 45.

The tubular suction element 42 has, at its end that is opposite to the one in communication with the suction port 25, an air discharge port 46.

More particularly, the tubular suction element 42 is structured so that the injection of pressurized air at the intake port 43 allows to create at the end of the tubular element 42 in communication with the suction port 25 a partial vacuum, with respect to the atmospheric pressure, while the air fed through the intake port 43 is discharged at the discharge port 46 together with the air aspirated through the suction port 25.

Preferably, a single pressurized air generator 45 is provided, mounted integrally with the fixed structure 10*a* of the application station 10 and constituted, for example, by a compressor to which the feeding channel 44 of each one of the application assemblies 12 can be connected.

Conveniently, the pressurized air generator 45 is connected, with its delivery, to a pressurized air distribution unit 47, which is integral with the fixed structure 10*a* of the application station 10 and to which the feeding channels 44 of the application assemblies 12 are connected during the movement of the application assemblies 12 with respect to the fixed structure 10*a* of the application station 10.

In particular, the pressurized air distribution unit 47 has an intake port 47*a* connected to the delivery of the pressurized air generator 45 and an output slot 47*b* that extends parallel to a portion of the path of the application assemblies 12 about the axis of the output star conveyor 8.

More particularly, the feeding channel 44 of each application assembly 12 has, at its end opposite to the one connected to the intake port 43 of the corresponding suction device 40, a supply port 48, which, when the corresponding application assembly 12 passes at the pressurized air distribution unit 47, connects to the output slot 47*b* of the pressurized air distribution unit 47, so as to determine the inflow of pressurized air through the feeding channel 44, during the movement of the corresponding application assembly 12 along the portion of its path around the axis of the output star conveyor 8 in which the corresponding application assembly 12 is passing at the pressurized air distribution unit 47.

Conveniently, the feeding channel 44 of each application assembly 12 has at least one portion 44*a* which extends along the axis of the corresponding oscillation shaft 27 and is connected, in input, to the supply port 48, by means of a first pressurized air duct 49, and, in output, to a second pressurized air duct 50, conveniently constituted by a flexible hose, which reaches the suction device 40 for example by means of a coupling connector 51, which is connectable to the cartridge 41.

In particular, the portion 44*a* of the feeding channel 44 formed along the oscillation shaft 27 is advantageously connected to the first pressurized air duct 49 by means of a first rotary joint 52 and to the second pressurized air duct 50 by means of a second rotary joint 53.

It should be noted that conveniently the supply ports 48 of the application assemblies 12 are defined in a movable distribution unit 54, integrally connected to the annular plate 28, which faces the pressurized air distribution unit 47 and to which the first pressurized air ducts 49 of the application assemblies 54 are connected.

The operation of the machine according to the invention is as follows.

When a container 3 arranged on a supporting plate 7 of the carousel 6 and engaged in an upper region by a respective retention head 5 arrives at the transfer station 9, it receives from the drum 11 a respective safety strip 4 which is arranged substantially vertically and adheres, with its first end 4*a*, positioned in a lower region, to a first lateral portion 3*a* of the container 3, while its second end, positioned in an upper region, adheres to the retention head 5 that acts on the corresponding container 3.

Subsequently, the container 3 that has received the safety strip 4 at the transfer station 9 reaches, entrained by the carousel 6, the application station 10, where it is received by a receptacle 8*a* of the output star conveyor 8 and where it is taken by a respective application assembly 12, which has the first pad 13*a* in a retracted position and the second pad 13*b* in an inactive position.

In particular, while the respective application assembly 12 follows the container 3 in the portion of its advancement path defined by the output star conveyor 8, the first pad 13*a* and the abutment element 20 are engaged, from mutually opposite sides, against the container 3, so as to clamp the container 3 between the first pad 13*a* and the abutment element 20.

Before the arrival of the container 3 at the application station 10, the supporting plate 7 of the container 3 can be operated rotationally to ensure that the first lateral portion 3*a* of the container 3 is directed toward the first pad 13*a*, so that the first pad 13*a*, once brought against the container 3, can keep the first end 4*a* of the safety strip 4 pressed against the container 3.

At this point, the application assembly 12 that acts on the container 3 passes at the output slot 47*b* of the pressurized air distribution unit 47 and consequently the supply port 48 of the corresponding pressurized air feeding channel 44 enters in communication with the output slot 47*b* of the pressurized air distribution unit 47.

In this manner, the suction device 40 supported by the corresponding second pad 13*b*, is fed by the pressurized air flow, thus creating a partial vacuum inside the tubular suction element 42 with respect to the atmospheric pressure, which produces the extraction of air from outside toward the suction port 25.

At the same time, the follower roller 35 traces the first descending inclined portion 34*b* and then the second rising inclined portion 34*c* of the sliding guide 34 of the cam-based actuation device 33, so that the second pad 13*b*, by performing the first oscillating motion about its own rotation axis, can pick up the second end 4*b* of the safety strip 4 from the retention head 5 that acts on the container 3, returning then to an inactive position with the second end 4*b* of the safety strip 4 retained on its working face by the retention action applied by the corresponding suction port 25.

The container 3, continuing in its movement on the output star conveyor 8, is then moved away from the carousel 6 and from the corresponding retention head 5.

At this point, the follower roller 35 reaches the second descending inclined portion 34*e*, so as to produce the transition of the second pad 13*b* from the inactive position to the application position.

The second pad 13*b* then maintains the reached application position as long as the follower roller 35 follows the third flat portion 34*f*, so as to ensure the adhesion of the second end 4*b* of the safety strip 4 to the second lateral portion 3*b* of the container 3.

In the meantime, the application assembly 12, continuing in its movement with respect to the fixed structure 10*a* of the application station 10, moves beyond the pressurized air distribution unit 47, with consequent interruption of the communication between the supply slot 48 of the corresponding feeding channel 44 and the output slot 47*b* of the pressurized air distribution unit 47.

In this manner, since the suction device 40 is no longer fed with the pressurized air flow, the suction port 25 ceases to exert a retention action on the second end 4*b* of the safety strip 4.

The follower roller 35 then traces the second rising inclined portion 34*g*, with consequent transition of the second pad 13*b* from the application position to the inactive position.

At this point, the container 3 with the safety strip 4 applied to its upper portion leaves the output star conveyor 8 to be sent to other optional processes.

In practice it has been found that the invention achieves the intended aim and objects, by virtue of the fact that the machine for applying safety strips to the upper part of containers according to the invention uses decentralized and mutually independent suction devices.

In particular, it is noted that the machine according to the invention, by virtue of the fact that the action of the suction ports of the second pads of the application assemblies can be produced by respective suction devices fed by pressurized air flows, has the advantage that dirt is deposited only locally at the suction devices, which are in a position that can be reached easily for convenient cleaning or replacement.

Furthermore, unlike known machines, the machine according to the invention has the advantage that the absence of an application strip at the container treated by one application assembly does not result in a loss of vacuum at the suction ports of the second pad of the other application assemblies, since the suction action is produced, for each application assembly, by the corresponding suction device, independently of the other application assemblies.

The invention thus conceived is susceptible of numerous modifications and variations, all of which are within the scope of the appended claims; all the details may furthermore be replaced with other technically equivalent elements.

In practice, the materials used, so long as they are compatible with the specific use, as well as the contingent shapes and dimensions, may be any according to the requirements and the state of the art.

The disclosures in Italian Patent Application No. 102022000001631 from which this application claims priority are incorporated herein by reference.

The invention claimed is:

1. A machine for applying safety strips to an upper part of containers, comprising: conveyance means for conveying the containers along an advancement path, said conveyance means having retention heads designed to act upward on the containers, along said advancement path there being in mutual succession at least one transfer station, configured to transfer to the upper part of the containers a respective safety strip arranged substantially vertically and with a first end thereof, located in a lower region, applied to a first lateral portion of a corresponding container and a second end thereof, located in an upper region, applied to a retention head that acts on the corresponding container, and at least one application station which comprises at least one application assembly which is configured to move substantially parallel to at least one portion of said advancement path of the containers and in a manner which is synchronized with the movement of the containers on said conveyance means, in order to follow a respective container, said at least one application assembly having at least one crimping device which comprises a first pad, designed to make contact, with a working face thereof, with the first end of the safety strip applied to the corresponding container, and a second pad, which is provided, on a working face thereof, with at least one suction port, for a removable retention of the second end of the safety strip, said second pad being able to move to oscillate with respect to said first pad about a rotation axis in order to allow said second pad to remove the second end of the safety strip from the retention head that acts on the corresponding container and to move the second end of the safety strip to adhere to a second lateral portion of the corresponding container, which is arranged on a side opposite to said first lateral portion, wherein the at least one application assembly comprises a suction device which is connected to the at least one suction port of the second pad;

wherein the second pad of the at least one application assembly is supported by a lever element which is connected rotatably to a supporting body, which is configured to move, with respect to a fixed structure of said application station, by means of an oscillation shaft which forms, with an axis thereof, said rotation axis, wherein at least one air feeding channel is extended, with at least one portion thereof, along the axis of said oscillation shaft.

2. The machine according to claim 1, wherein the suction device of the at least one application assembly is supported by the second pad.

3. The machine according to claim 1, wherein the suction device of the at least one application assembly comprises a respective vacuum generator.

4. The machine according to claim 3, wherein said vacuum generator comprises an electrically powered vacuum generator.

5. The machine according to claim 1, wherein said suction device is fed by a pressurized air flow, in order to generate an at least partial vacuum by said pressurized air flow.

6. The machine according to claim 1, wherein said suction device comprises a vacuum generator of the pneumatic type.

7. The machine according to claim 1, wherein said suction device comprises a tubular suction element which communicates axially with the at least one suction port and is connected radially to the at least one air feeding channel for feeding pressurized air.

8. The machine according to claim 7, wherein the at least one air feeding channel of the at least one application assembly is connectable to a pressurized air generator.

9. The machine according to claim 1, wherein said oscillation shaft is kinematically connected to a cam-based device which is integral with the fixed structure of said application station and is contoured to determine a rotational actuation of said oscillation shaft about the axis thereof in response to the movement of said supporting body relative to the fixed structure of said application station.

* * * * *